(12) United States Patent
Johnson et al.

(10) Patent No.: US 12,105,862 B2
(45) Date of Patent: Oct. 1, 2024

(54) MULTI-FACTOR DEVICE HOLDER

(71) Applicant: Walmart Apollo, LLC, Bentonville, AR (US)

(72) Inventors: Christopher Soames Johnson, Pea Ridge, AR (US); Timothy Lars Brush, Springdale, AR (US); Tony Marvin Mays, Rogers, AR (US)

(73) Assignee: Walmart Apollo. LLC, Bentonville, AR (US)

( * ) Notice: Subject to any disclaimer, the term of this patent is extended or adjusted under 35 U.S.C. 154(b) by 696 days.

(21) Appl. No.: 17/392,594

(22) Filed: Aug. 3, 2021

(65) Prior Publication Data

US 2022/0050930 A1   Feb. 17, 2022

Related U.S. Application Data

(60) Provisional application No. 63/064,241, filed on Aug. 11, 2020.

(51) Int. Cl.
| | | |
|---|---|---|
| *G06F 21/82* | (2013.01) | |
| *G06F 3/08* | (2006.01) | |
| *G06F 21/32* | (2013.01) | |
| *G06F 21/86* | (2013.01) | |
| *G06F 21/88* | (2013.01) | |
| *G06V 40/12* | (2022.01) | |
| *H04W 12/50* | (2021.01) | |

(52) U.S. Cl.
CPC ............... *G06F 21/82* (2013.01); *G06F 3/08* (2013.01); *G06F 21/32* (2013.01); *G06F 21/86* (2013.01); *G06F 21/88* (2013.01); *G06V 40/1365* (2022.01); *H04W 12/50* (2021.01)

(58) Field of Classification Search
CPC .......... G06F 21/82; G06F 21/86; G06F 21/32; G06F 21/88; G06F 3/08; H04W 12/56; G06V 40/1365
USPC .......................................................... 726/34
See application file for complete search history.

(56) References Cited

U.S. PATENT DOCUMENTS

| | | |
|---|---|---|
| 8,122,172 B2 | 2/2012 | Lu et al. |
| 9,032,498 B1 * | 5/2015 | Ben Ayed ............... G06F 21/35 726/9 |
| 9,294,476 B1 * | 3/2016 | Lurey ................. H04L 63/0838 |
| 9,529,991 B2 | 12/2016 | Singhal |
| 10,182,040 B2 | 1/2019 | Hu et al. |
| 10,762,183 B1 * | 9/2020 | Charan ................... G06F 21/40 |

(Continued)

*Primary Examiner* — Samson B Lemma
(74) *Attorney, Agent, or Firm* — Foley IP Law, PLLC

(57) ABSTRACT

Examples provide a multi-factor device holder (MDH) for storing multi-factor authentication devices. A housing encases a set of ports configured to connect to the set of connectors on two or more multi-factor authentication devices placed within the MDH. An external port can connect the MDH to a port on a user device. A selection device, such as a user interface, enables user selection of an authentication device from the set of authentication devices. A locking mechanism secures the housing in a closed configuration to prevent unauthorized access to the authentication devices stored within the MDH. The MDH can include a user authentication device, such as a biometric reader, to authenticate a user attempting to utilize the MDH. If authorized, the selected authentication device is unlocked and provided with power. The selected authentication device transmits a code to the user device via the external port connector.

17 Claims, 14 Drawing Sheets

(56) References Cited

U.S. PATENT DOCUMENTS

| | | | |
|---|---|---|---|
| 10,977,354 B1* | 4/2021 | Depaolo | G06F 21/34 |
| 11,781,344 B2* | 10/2023 | Bloom | E05B 47/0012 |
| | | | 70/21 |
| 2007/0223685 A1* | 9/2007 | Boubion | G06F 21/32 |
| | | | 380/2 |
| 2007/0271596 A1* | 11/2007 | Boubion | G06F 21/77 |
| | | | 726/3 |
| 2011/0101093 A1 | 5/2011 | Ehrensvard | |
| 2017/0208059 A1* | 7/2017 | Shin | H04W 12/069 |
| 2022/0070268 A1* | 3/2022 | Gant | F41A 17/063 |

* cited by examiner

| USER INTERFACE 208 | | |
|---|---|---|
| 1138 List of authentication Devices | | |
| 1202 Key "A" | 1204 Account 1 | 1206 Role 1 |
| Key "B" | Account 2 | Role 1 |
| Key "C" | Account 2 | Role 2 |
| Key "D" | Account 3 | Role 1 |
| Key "E" | Account 4 | Role 1 |
| | | |

*FIG. 12*

MULTI-FACTOR DEVICE HOLDER

BACKGROUND

A multi-factor authentication device is a hardware device used to securely authenticate a user. The multi-factor authentication device is plugged into a port on a computing device, such as when a user attempts to securely log into or otherwise access an account. In some examples, the authentication device emits a one-time password or uses a public/private key pair generated by the authentication device to authenticate the user for access to the account. Typically, a single multi-factor authentication device is paired to a single account and/or user role. If a user has multiple accounts and/or multiple roles for each account, the user also has multiple different multi-factor authentication devices. These devices are small, easy to lose and may have identical appearance making it difficult for a user to identify which device is required to access a particular account. Even if the user manually labels each key, the user must still manually connect and disconnect each key separately to switch between different accounts and roles. This is an awkward and time-consuming process. Moreover, it can be cumbersome and inconvenient to carry and keep track of multiple authentication devices.

SUMMARY

Some examples provide a multi-factor device holder (MDH). The MDH includes an external port connector configured to communicatively couple to a port on a user device. A key selection device includes at least one selection mechanism for selecting an authentication device from a set of authentication devices. The key selection device can include, without limitation, a user interface (UI) or a set of buttons or controls on the MDH. A set of ports enclosed within a housing. The set of ports can connect to a set of port connectors on the set of authentication devices. A locking mechanism is configured to secure the housing in a closed configured when locked. A controller component unlocks the selected authentication device. Power is provided to the selected authentication device. The selected authentication device transmits a code to the user device via the external port connector.

Other examples provide a method for storing a set of authentication devices within a multi-factor device holder (MDH). A user authentication device authenticates a user based on biometric data generated by at least one biometric reader. Detecting an external port connector communicatively coupled to a port on a user device. A list of authentication devices stored within the MDH is output if the user is authenticated by the user authentication device. A selection of an authentication device is received from the list of authentication devices. A controller component unlocks the selected authentication device. The unlocked first selected authentication device receives power from at least one power supply. A code generated by the selected authentication device is transmitted to the user device via the external port connector.

Still other examples provide a multi-factor device holder (MDH) for storing a plurality of authentication devices. The MDH includes a processor communicatively coupled to a memory. A set of ports are enclosed within the housing. The set of ports communicatively couple to a set of connectors on a set of authentication devices. A user interface device outputs a list of identifiers associated with a set of authentication devices stored within the housing of the MDH. A controller component activates a selected authentication device responsive to receiving a selection of an authentication device from the list via the user interface device. An external port connector connects to a port on a user device. A code generated by the selected authentication device is pushed to the user device via the external port connector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 12 is an exemplary block diagram illustrating a user interface displaying a list of authentication devices stored in the MDH for selection by a user.

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a multi-factor device holder (MDH) for storing multi-factor authentication devices. In some examples, the MDH includes an external port connector enabling a single MDH to be plugged into a computing device while enabling any authentication device within the MDH to transmit an authentication code to the computing device via the external port connector. This enables the user to plug in multiple authentication devices simultaneously via the MDH. It further reduces the number of times the user has to plug in or unplug authentication devices while providing an easier way to transport and use these devices in a secure manner.

Figure 1:
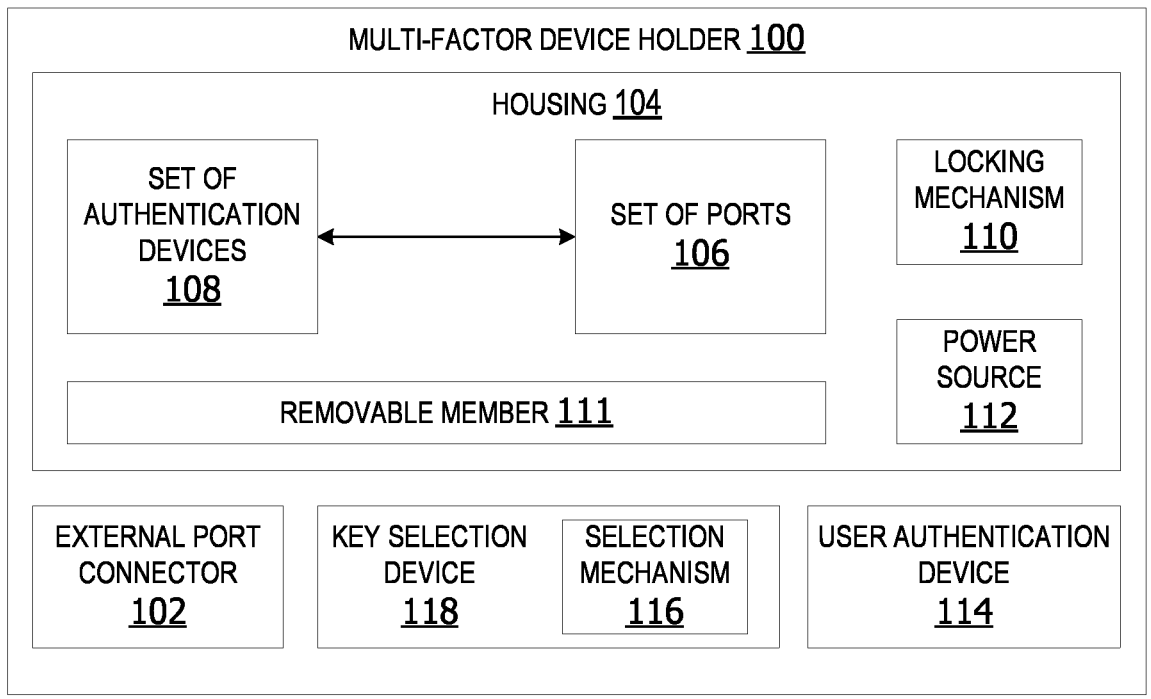
FIG. 1 is an exemplary block diagram illustrating a multi-factor device holder (MDH).

Referring now to FIG. 1, an exemplary block diagram illustrating a multi-factor device holder (MDH) 100 is shown. The multi-factor device holder 100 is a device for storing one or more multi-factor devices. A multi-factor device is a physical device for authenticating a user, such as when a user attempts to securely log into or otherwise access an account. A multi-protocol physical authentication device can include, for example but without limitation, a Yubikey®, a Google® Titan security key, a key card, or any other type of physical hardware device providing a password, pin, electronic key, or other code for authenticating a user.

The MDH 100 includes an external port connector 102 for connecting the MDH 100 into a corresponding port on a computing device or other electronic device. In some examples, the external port connector 102 may be implemented as any type of connector for connecting the MDH 100 to the corresponding port on a computing device. In other examples, the external port connector 102 is configured to connect to a port on an adapter. An external port connector on the adapter is then plugged into the port on the computing device. The external port connector 102 is implemented as, for example, a universal serial bus (USB) type a connector, a USB-c connector, a lightning connector, high-definition multimedia interface (HDMI) connector, or any other type of port connector.

The MDH 100 includes a housing 104 enclosing a set of two or more ports 106. In some examples, the set of ports 106 includes four ports. In other examples, the set of ports 106 includes six ports.

The housing 104 is a casing or container for encasing a set of one or more authentication devices 108. Each authentication device in the set of authentication devices 108 is a multi-factor authentication device for enabling secure access to an account, website, data store, application, or other resource. Each port in the set of ports is configured to accommodate a corresponding external port connector on each authentication device in the set of authentication devices stored within the MDH 100.

A locking mechanism 110 optionally secures a removable member 111 of the housing into a closed configuration. The removable member 111 may include a cap, sliding member, hinged member, or other portion of the housing capable of opening to permit user access to the interior of the housing enclosing the set of authentication device 108. The removable member 111 closes to prevent access to the set of authentication devices 108 within the housing.

The removable member 111 in some examples remains at least partially attached to the housing when in the open configuration. In these examples, the removable member may slide open or swing open on a hinge. In other examples, the removable member 111 may be completely detachable from the housing, such as, but not limited to, a removable panel or cap which can be clipped, screwed, latched, or otherwise secured to the housing when in the closed configuration.

The locking mechanism 110 in some examples is implemented as any type of device for securing the removable member 111 in the closed configuration when locked. The locking mechanism 110 in some examples includes a physical locking component which physically holds the removable member in the closed configuration. The locking mechanism 110 can include, for example, but without limitation, a bolt, a pin, latch, cylinder lock or any other type of locking mechanism.

The locking mechanism 110 optionally also includes an electronic locking component which electronically engages or releases the physical locking component. The power source 112 in some examples provides power to the locking mechanism 110 to lock or unlock the locking mechanism.

In some examples, the MDH 100 includes a power source 112. The power source 112 may be implemented as any type of power source, such as, but not limited to, a rechargeable battery. In these examples, the battery recharges when the MDH 100 is plugged into a user device or other power supply.

In other examples, the power source 112 could include a solar panel using light power, motion power which converts twisting movements into power, or other types of power sources. In still other examples, the MDH 100 obtains power when the MDH 100 is plugged into a port on a computing device.

A key selection device 118 is provided on an exterior surface of the housing. The key selection device 118 includes a selection mechanism 116 enabling the user to select one authentication device from the set of authentication devices 108 housed within the MDH 100 for activation. The selected authentication device is activated to generate the password, code, or other authentication code for account access.

All the authentication devices in the set of authentication devices 108 are initially locked or dormant while stored inside the MDH. When the user plugs the MDH into a port on a computing device, the key selection device 118 enables the user to select one authentication device for activation. Upon activation, the selected authentication device is provided with power and enabled to transmit the password or other code for authenticating the user with regard to an account and/or role mapped to the selected authentication device. The remaining un-selected authentication devices within the MDH 100 remain in the locked or dormant (de-activated) state. Only a single authentication device is activated at any given time. If no authentication device is selected, all the authentication devices within the MDH 100 remain de-activated. While de-activated, the authentication device does not transmit the authentication code and remains in a powered-down (unpowered) state.

The key selection device 118 in some examples is implemented as a set of physical controls or buttons on the exterior of the housing 104. Each button corresponds to a slot or space within the housing 104 configured to accommodate an authentication device. If the user selects a button on the housing corresponding to an authentication device plugged into a port in the set of ports 106 within the housing, that authentication device is selected for activation.

In other examples, the key selection device 118 includes a user interface on the exterior of the housing. The user interface can include a touch screen or other input device enabling the user to select an authentication device from a list of authentication devices currently stored within the housing 104. The list is a catalog or inventory of the authentication devices currently stored within the MDH.

When an authentication device is selected, the MDH 100 supplies power to the selected authentication device via the power source 112 or from a power supply provided via the computing device to which the MDH 100 is connected. Once activated, the selected authentication device generates the authentication code. The MDH 100 transmits the authentication code to the computing device via the external port connector 102.

The MDH 100 optionally includes a user authentication device 114 for authenticating a user prior to enabling the user to select an authentication device for activation and/or open the removable member 111. The user authentication device 114 provides an additional layer of security for preventing unauthorized usage of the authentication devices within the MDH.

The user authentication device 114 in some examples includes a biometric reader for reading biometric data, such as, but not limited to, a fingerprint or thumbprint. In other examples, the user authentication device 114 includes a camera for obtaining facial recognition or optical recognition data. If the user is authenticated, the user is permitted to utilize the set of authentication devices stored within the MDH 100 and/or open the housing to add authentication device(s) to the interior of the MDH 100 or remove authentication device(s) from the MDH 100. If the user is not authenticated, the MDH 100 can optionally deny the user access to the authentication devices and/or disable the authentication devices to prevent unauthorized use or tampering.

Figure 2:
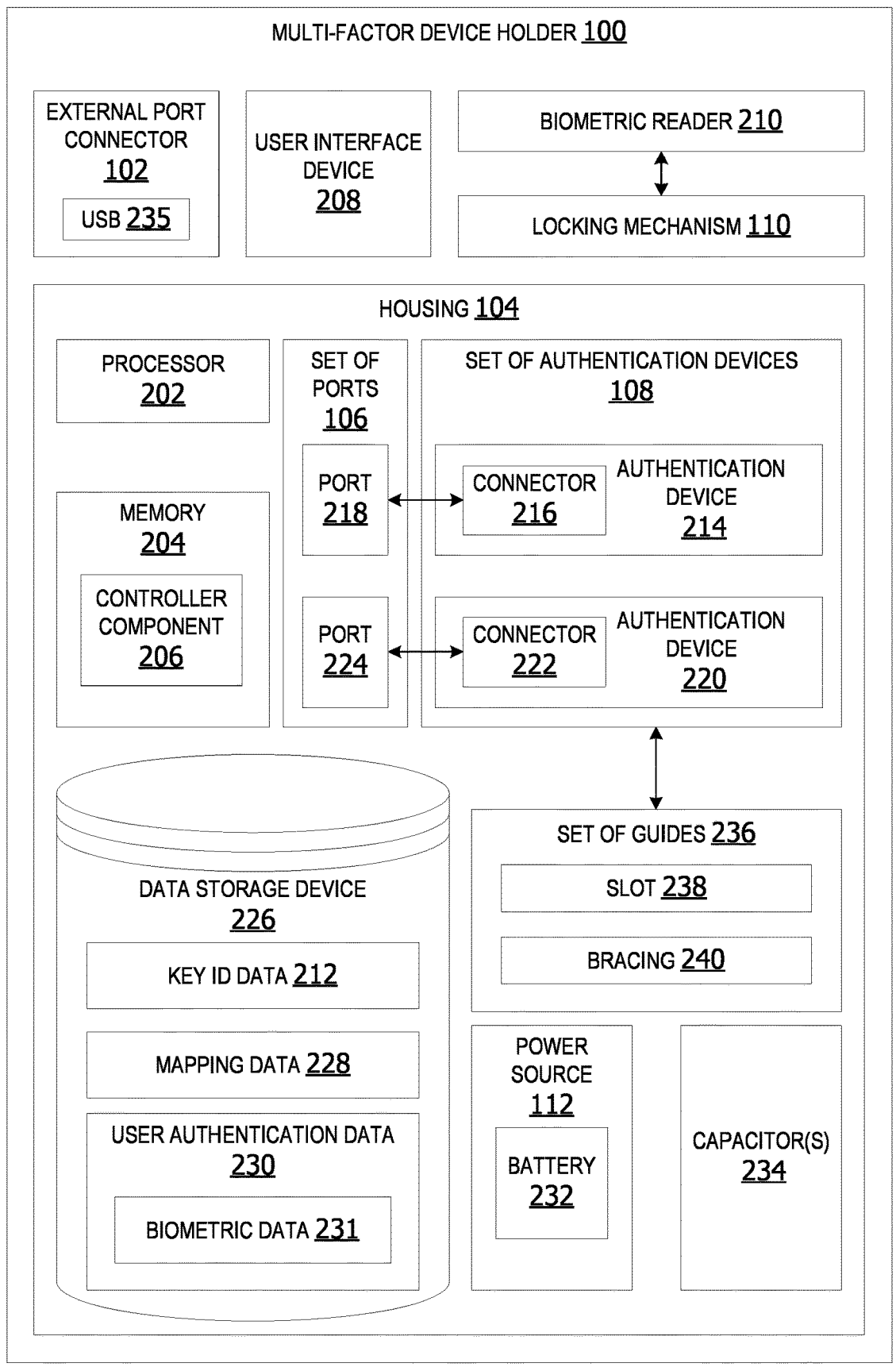
FIG. 2 is an exemplary block diagram illustrating an MDH including a controller component for managing access to authentication devices within the MDH.

FIG. 2 is an exemplary block diagram illustrating an MDH 100 including a controller component for managing access to authentication devices within the MDH 100. The MDH 100 in some non-limiting examples has at least one processor 202 and a memory 204.

The processor 202 includes any quantity of processing units and is programmed to execute computer-executable instructions. In some examples, the processor 202 is programmed to execute instructions such as those illustrated in the figures (e.g., FIG. 13, FIG. 14, FIG. 15, and FIG. 16).

The MDH 100 further has one or more computer-readable media such as the memory 204. The memory 204 includes any quantity of media associated with or accessible by the MDH 100. The memory 204 stores data, such as one or more applications. The applications, when executed by the processor 202, operate to perform functionality on the MDH 100. The applications can communicate with counterpart applications or services such as web services accessible via a network.

The memory 204 in some examples stores one or more computer-executable components, such as, but not limited to, a controller component 206. The controller component 206 maps each authentication device in the set of authentication devices 108 stored on the MDH to a user account or role. The user sets up the mapping via the user interface device 208.

The user interface device 208 is an example of a key selection device, such as, but not limited to, the key selection device 118 in FIG. 1. The user interface device 208 includes a graphics card for displaying data to the user and receiving data from the user. The user interface device 208 can also include computer-executable instructions (e.g., a driver) for operating the graphics card. Further, the user interface device 208 can include a display (e.g., a touch screen display or natural user interface) and/or computer-executable instructions (e.g., a driver) for operating the display. The user interface device 208 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands The controller component 206, in other examples, utilizes data received from a user authentication device, such as, but not limited to, a biometric reader 210 to lock or unlock the MDH 100 via a locking mechanism 110. The biometric reader 210 is any type of device for generating or detecting biometric data. The biometric reader 210 in this example is a fingerprint reader. In other examples, the biometric reader 210 can include a facial recognition system, an optical/retinal recognition system or any other type of biometric reader.

When a user inserts a new authentication device into the MDH 100, the controller component 206 prompts the user to enter key identifier (ID) data 212 for each device in the set of authentication devices. In this example, an authentication device 214 is plugged into a port 218 in the set of ports 106 via a connector 216. A second authentication device 220 is plugged into a second port 224 via a connector 222. Each authentication device 214 and 220 is assigned an ID by the user and stored as key ID data 212 within the data storage device 226.

The data storage device 226 can include one or more different types of data storage devices, such as, for example, one or more rotating disks drives, one or more solid state drives (SSDs), and/or any other type of data storage device. The data storage device 226 in some non-limiting examples includes a redundant array of independent disks (RAID) array. In other examples, the data storage device 226 includes a database.

The data storage device 226 stores data such as, but not limited to, the key ID data 212, mapping data 228 and/or user authentication data 230, as well as any other relevant data associated with managing devices within the MDH 100.

The mapping data 228 is data mapping each authentication device in the set of authentication devices 108 to a user account and/or user role associated with a user account. The user authentication data 230 is data utilized to authenticate a user. In some examples, the user authentication data 230 is used to analyze biometric data 231 received from the biometric reader 210 to verify the user is authorized to utilize the set of authentication devices 108 and/or open the MDH 100.

The MDH 100 can optionally include an independent power source 112, such as, but not limited to, a battery 232. The power source 112 is utilized when the external port connector 102 is not plugged into a port on a computing device having a power supply of its own. When the external port connector 102 is plugged into a corresponding port on a powered device, the MDH 100 draws power from the powered device via the external port connector 102. In an example, the MDH 100 draws power from a computing device when the USB 235 is plugged into a corresponding port on the computing device.

The MDH 100, in other examples, optionally includes one or more capacitor(s) 234. The capacitor(s) 234 are utilized to increase the voltage from the power source 112. In some non-limiting examples, if an unauthorized user attempts to utilize the authentication devices stored on the MDH 100, the controller component 206 can wipe the memory on the MDH 100 and/or destroy the authentication devices stored on the MDH 100 by sending a power surge from the capacitor(s) 234 to the processor 202, memory 204, data storage device 226 and/or the set of authentication devices.

A set of guides 236 are provided in some examples. The set of guides 236 can include one or more slots, rails, bracings, or other guidance members to secure each authentication device in place. The set of guides 236 prevent an authentication device plugged into a port within the interior of the MDH 100 from sliding, bending, twisting, or otherwise moving. The set of guides 236 help to hold each authentication device in a stable and secure position/orientation while plugged into the MDH. The set of guides 236 can further prevent damage to the port connector on an authentication device plugged into a port within the MDH 100.

The set of guides 236 in some examples include one or more slots, such as, but not limited to, slot 2386. A slot is provided for each port in the set of ports within the interior storage area of the MDH 100. If the set of ports includes four ports, the set of guides 236 includes four slots, one slot for each authentication device plugged into each port.

The set of guides 236 can optionally include one or more bracings. A bracing 240 includes a guide, railing, tab, lip, groove, or any other member within the interior of the MDH configured to hold an authentication device in place when the authentication device is plugged in. The set of guides 236 also guide the authentication device connector into the correct port when the authentication device is initially placed/plugged into a port within the MDH 100.

Figure 3:
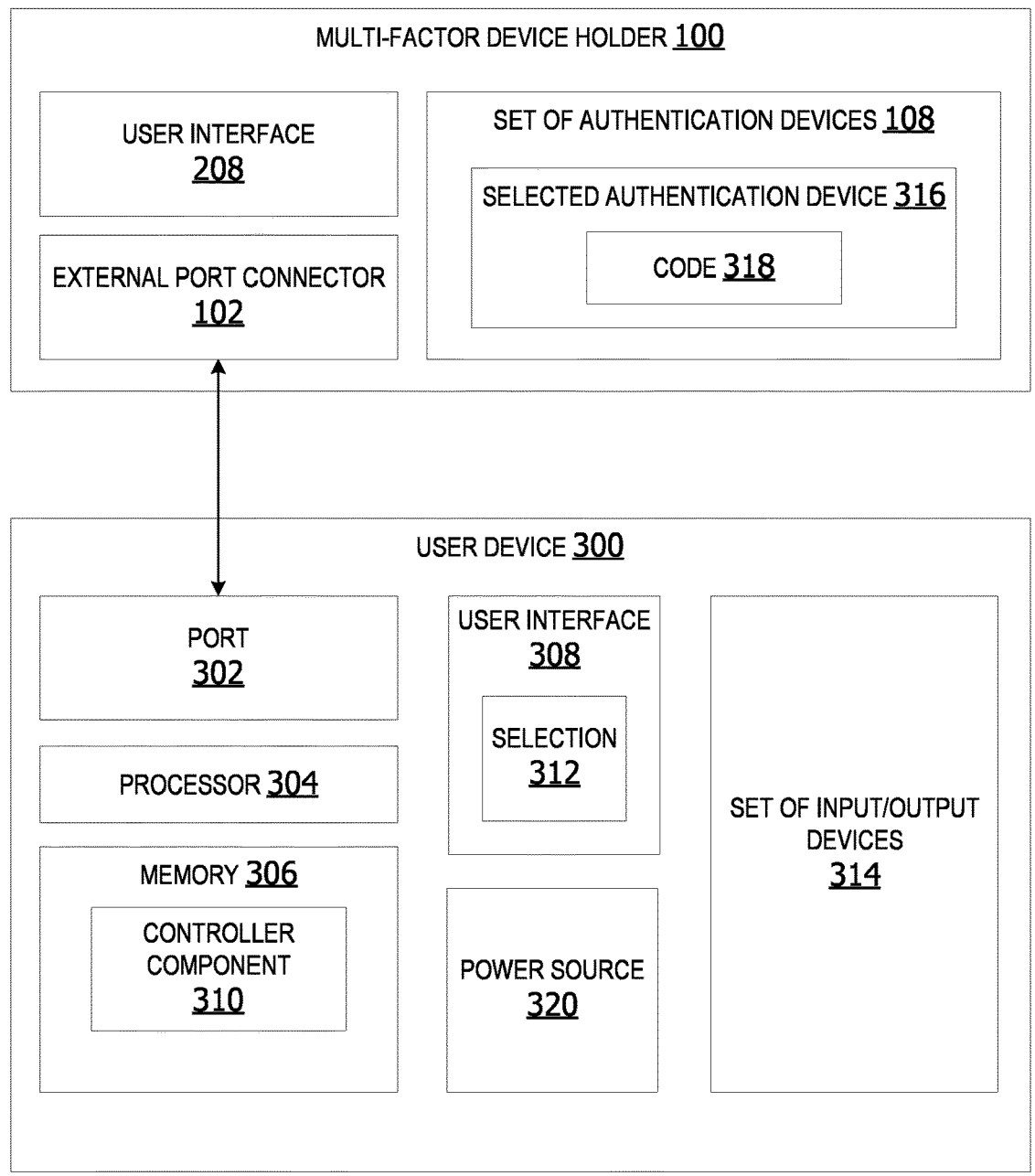
FIG. 3 is an exemplary block diagram illustrating an MDH plugged into a user device 300.

FIG. 3 is an exemplary block diagram illustrating an MDH plugged into a user device 300. The user device 300 represents any device executing computer-executable instructions (e.g., as application programs, operating system functionality, or both) to implement the operations and functionality associated with the user device 300. The user device 300 in some examples includes a mobile computing device or any other portable device. A mobile computing device includes, for example but without limitation, a mobile telephone, laptop, tablet, computing pad, netbook, gaming device, and/or portable media player. The user device 300 can also include less-portable devices such as servers, desktop personal computers, kiosks, or tabletop devices. Additionally, the user device 300 can represent a group of processing units or other computing devices.

In some examples, the user device 300 has at least one processor 304 and a memory 306. The user device 300 in other examples includes a user interface 308 device.

The processor 304 includes any quantity of processing units and is programmed to execute the computer-executable instructions. The computer-executable instructions is performed by the processor 304, performed by multiple processors within the user device 300 or performed by a processor external to the user device 300. In some examples, the processor 304 is programmed to execute instructions such as those illustrated in the figures (e.g., FIG. 13, FIG. 14, FIG. 15 and/or FIG. 16).

The user device 300 further has one or more computer-readable media such as the memory 306. The memory 306 includes any quantity of media associated with or accessible by the user device 300. The memory 306 in these examples is internal to the user device 300. In other examples, the memory 306 may be external to the computing device (not shown) or both (not shown).

The memory 306 stores data, such as one or more applications. The applications, when executed by the processor 304, operate to perform functionality on the user device 300. The applications can communicate with counterpart applications or services such as web services accessible via a network. In an example, the applications represent downloaded client-side applications that correspond to server-side services executing in a cloud.

In other examples, the user interface 308 device can include a display (e.g., a touch screen display or natural user interface) and/or computer-executable instructions (e.g., a driver) for operating the display. The user interface 308 device can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device in one or more ways.

The memory 306 in this example includes a controller component 310. When the MDH 100 is plugged into the port 302 via the external port connector 102, the controller component 310 on the user device 300 can receive user input via the user interface 308 and/or the set of input/output device 314. The set of input/output devices 314 can optionally include, without limitation, a keyboard, mouse, touch screen, microphone, haptic sensor, or any other type of input/output device.

In some examples, the controller component 310 communicates with another controller component on the MDH 100 to display a list of devices on the MDH. The user utilizes the user interface 308 on the user device 300 to ID authentication devices, map authentication devices to accounts, provide user authentication data and/or select an authentication device from the set of authentication devices 108 on the MDH. The selection 312 of an authentication device can optionally also occur on the MDH via the user interface 208 on the MDH 100.

The selected authentication device 316 is activated or unlocked by the controller component on the MDH 100 or the controller component 310 on the user device 300. The user device 300 provides power to the selected authentication device 316 via a power source 320 through the external port connector 102. The selected authentication device 316 generates a code 318 for authentication. The code 318 is transmitted to the user device 300 via the port 302.

Figure 4:
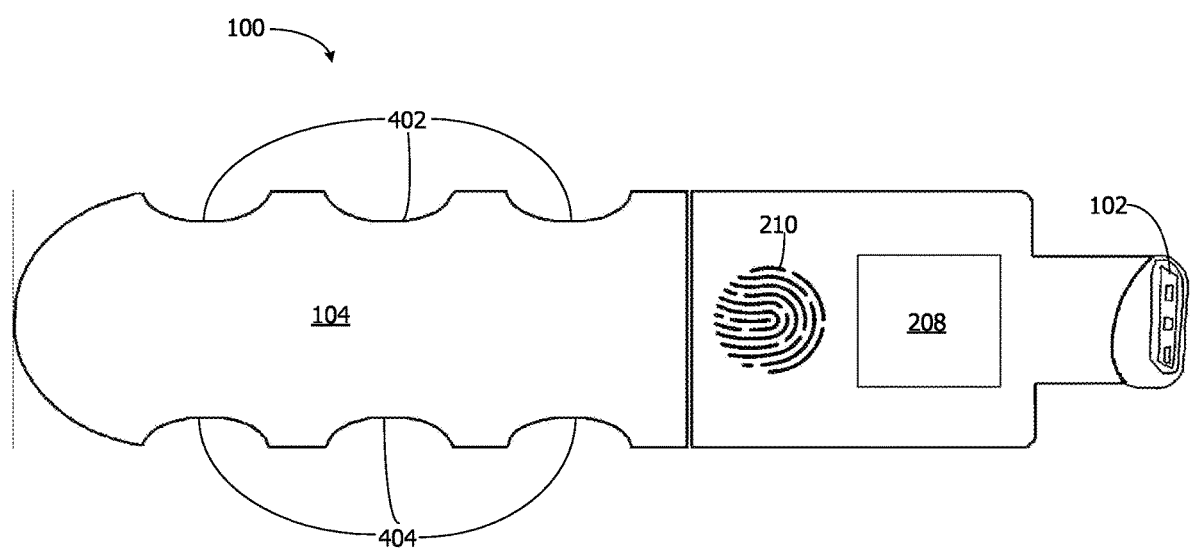
FIG. 4 is an exemplary block diagram illustrating an MDH having contoured hand grips on an external surface of the housing.

FIG. 4 is an exemplary block diagram illustrating an MDH 100 having contoured hand grips 402 and 404 on an external surface of the housing 104. The contoured hand grips in some non-limiting examples provide ergonomic ridges or contours configured to substantially conform to the shape of one or more of a user's fingers while gripping the main body of the MDH 100.

The user interface 208 in this example is positioned near the external port connector 102 and next to the biometric reader 210. However, the examples are not limited to placement of the user interface 208 near the external port connector 102. In other examples, the user interface 208 may be placed near an opposite end of the MDH 100, near the middle of the main body of the MDH, or anywhere else on the external surface of the housing which is accessible to a user.

Figure 5:
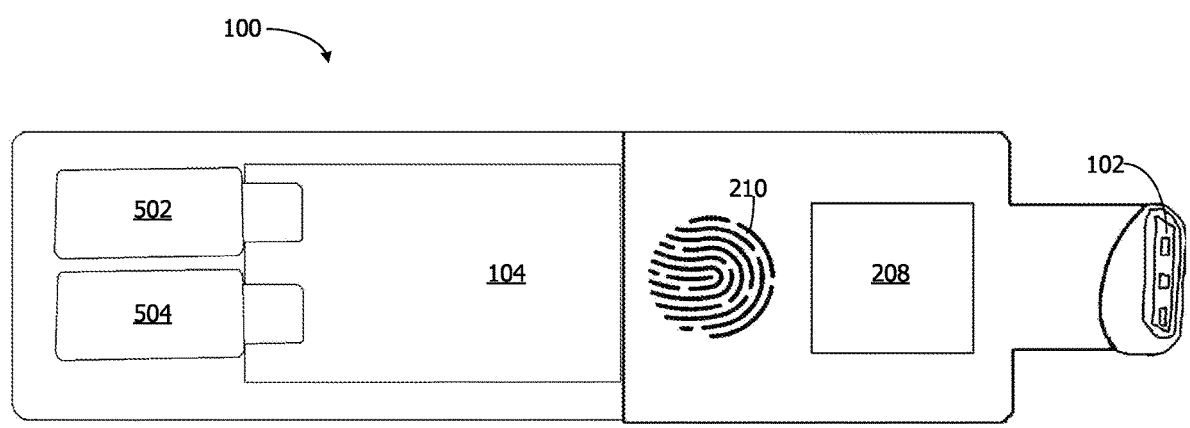
FIG. 5 is an exemplary block diagram illustrating an MDH having two authentication devices encased within the housing.

FIG. 5 is an exemplary block diagram illustrating an MDH 100 having two authentication devices 502 and 504 encased within the housing 104. In this non-limiting example, the biometric reader 210 is located next to the user interface 208 near the external port connector end of the MDH 100. However, the examples are not limited to this placement of the biometric reader 210. In other examples, the biometric reader 210 may be placed at the opposite end of the MDH, near the middle of the MDH, or any other location on the exterior surface of the MDH 100.

Figure 6:
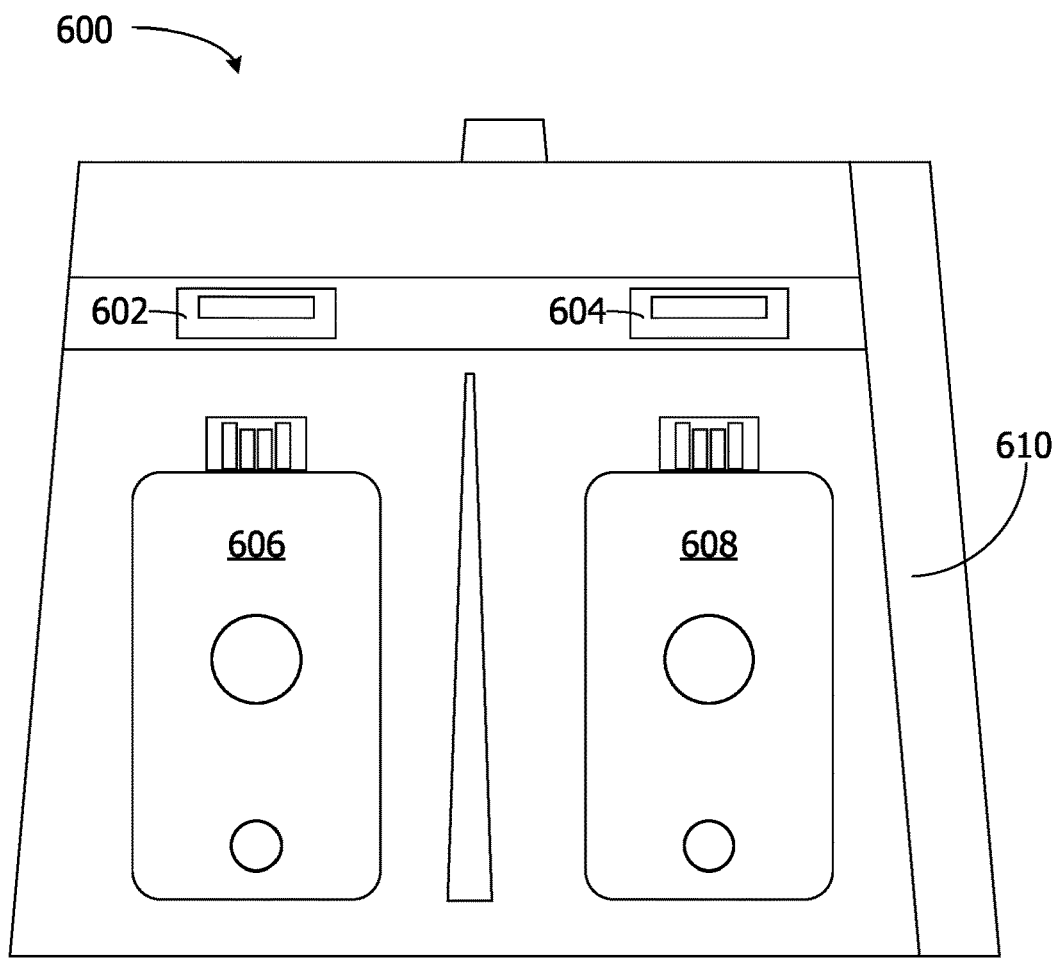
FIG. 6 is an exemplary block diagram illustrating an MDH having two ports capable of connecting to two authentication devices encased within the housing.

FIG. 6 is an exemplary block diagram illustrating an MDH 600 having two ports 602 and 604 capable of connecting to two authentication devices 606 and 608 encased within the housing 610. The MDH 600 is a multi-factor device holder, such as, but not limited to, the MDH 100 in FIG. 1, FIG. 2, FIG. 3, FIG. 4, and FIG. 5. The MDH in this example is configured to store two authentication devices. However, in other examples, the MDH stores three or more authentication devices.

Figure 7:
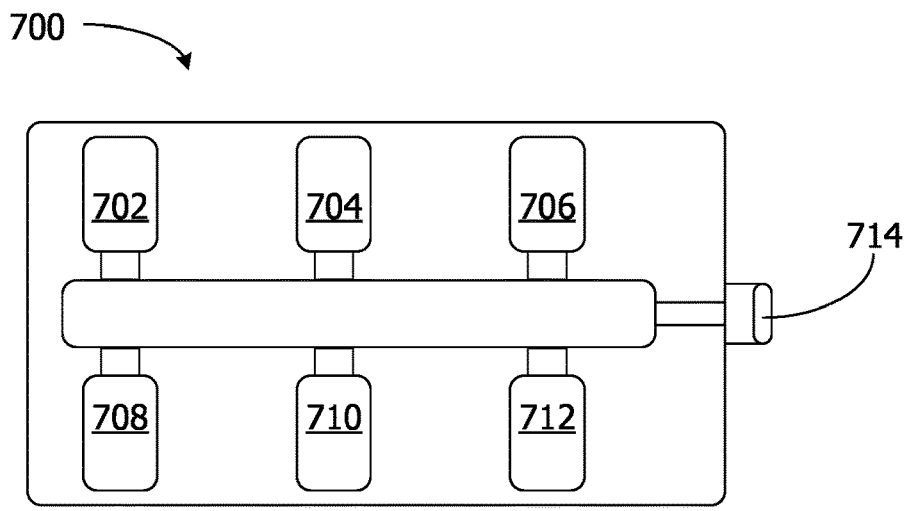
FIG. 7 is an exemplary block diagram illustrating an MDH having a set of six authentication devices stored within the MDH.

FIG. 7 is an exemplary block diagram illustrating an MDH 700 having a set of six authentication devices stored within the MDH 700. The MDH 700 is a device for storing authentication devices, such as, but not limited to, the MDH 100 in FIG. 1, FIG. 2, FIG. 3, FIG. 4, and FIG. 5. The MDH 700 in this non-limiting examples includes six authentication devices, such as, but not limited to, the authentication devices 702, 704 and 706 arranged along one side of the MDH 700 and authentication devices 708, 710 and 712 arranged along the opposite side. Each authentication device is plugged into a port which connects the authentication device to the controller component, a power supply, and/or the external port connector. If the user is authorized, the controller component enables power to flow to the selected authentication device. The authentication device transmits a code via the external port connector 714 to the user device connected to the external port connector.

The authentication devices in this example are arranged in a single layer, with half of the devices on one side and half the devices on the opposite side. However, the examples are not limited to this configuration. In other examples, the authentication devices may be in a double stacked configuration, arranged in a triple stacked configuration, arranged in a single, unstacked, single-file row, or any other configuration.

Figure 8:
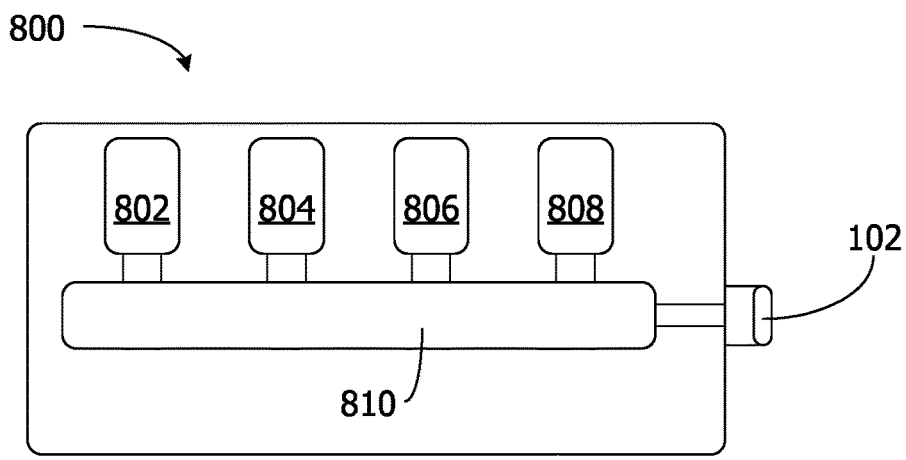
FIG. 8 is an exemplary block diagram illustrating an MDH having a set of four authentication devices stored within the MDH.

FIG. 8 is an exemplary block diagram illustrating an MDH 800 having a set of four authentication devices stored within the MDH. The MDH 800 is a device, such as, but not limited to, the MDH 100 in FIG. 1, FIG. 2, FIG. 3, FIG. 4, and FIG. 5. The MDH 800 in these examples include four authentication devices, 802, 804, 806 and 808. In other examples, the MDH can include a single device, two devices, three devices, as well as five or more devices. The devices are arranged in a single, unstacked row. In other examples, the devices within the housing of the MDH 8—may be stacked or arranged in multiple rows.

Figure 9:
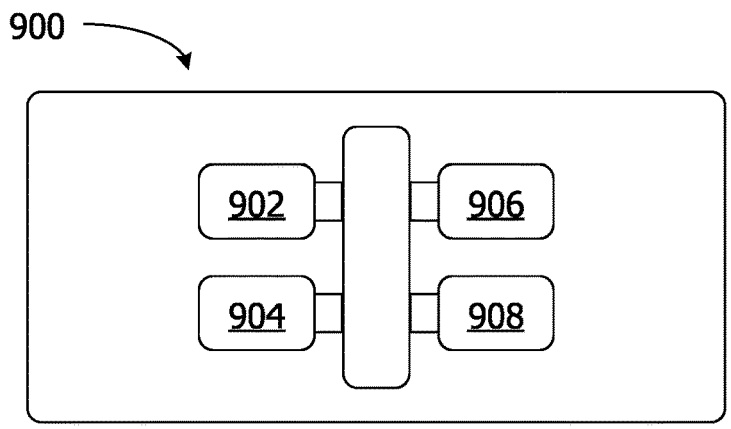
FIG. 9 is an exemplary block diagram illustrating an MDH having a stacked authentication devices stored within the MDH.

FIG. 9 is an exemplary block diagram illustrating an MDH 900 having a stacked authentication device stored within the MDH. The MDH 900 is a device, such as, but not limited to, the MDH 100 in FIG. 1, FIG. 2, FIG. 3, FIG. 4, and FIG. 5. In this non-limiting example, the authentication devices 902, 904, 906 and 908 are stacked in two layers, in which two devices are stacked in each column with two devices on one side and two devices on the other side of the center line. In other examples, the devices can be stacked in three or more layers in which there are three or more devices are stacked in each column.

Figure 10:
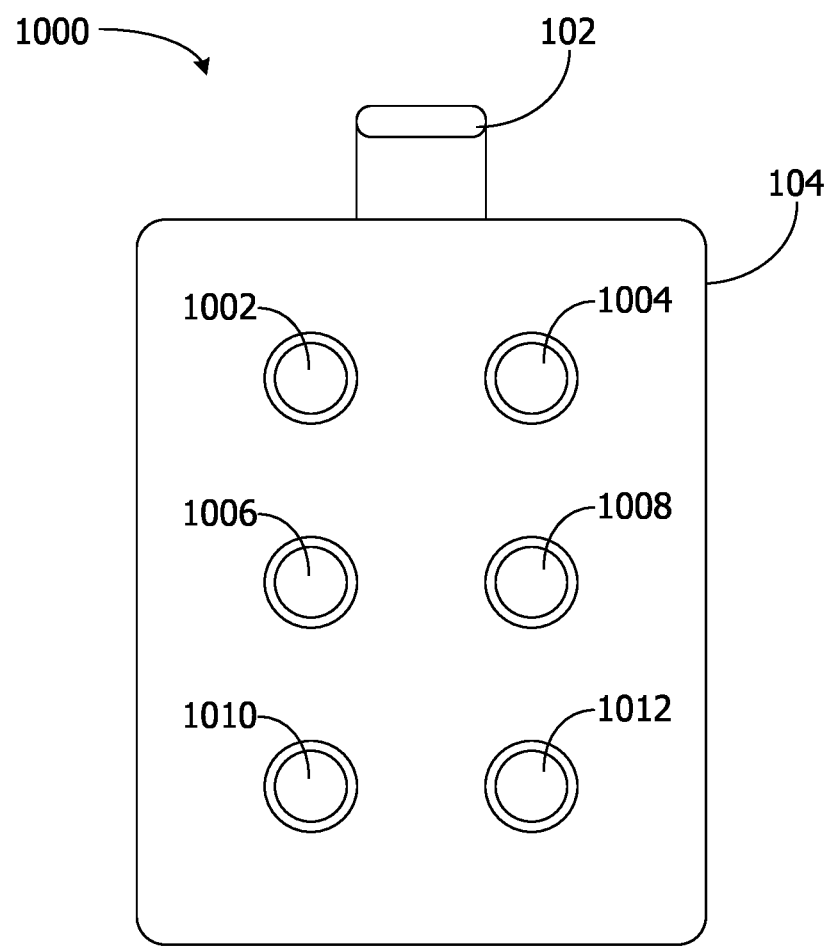
FIG. 10 is an exemplary block diagram illustrating an MDH having a set of controls on an exterior surface of the housing for selecting an authentication device.

FIG. 10 is an exemplary block diagram illustrating an MDH 1000 having a set of controls on an exterior surface of the housing for selecting an authentication device. The MDH 1000 is a device, such as, but not limited to, the MDH 100 in FIG. 1, FIG. 2, FIG. 3, FIG. 4, and FIG. 5.

In this example, the MDH 1000 includes a set of controls for selecting an authentication device from the plurality of authentication devices within the MDH 1000. The set of controls in this examples includes a button 1002 corresponding to a first authentication device, a button 1004 corresponding to a second authentication device, a button 1006 corresponding to a third authentication device, a button 1008 corresponding to a fourth authentication device, a button 1010 corresponding to a fifth authentication device and a button 1012 corresponding to a sixth authentication device.

Figure 11:
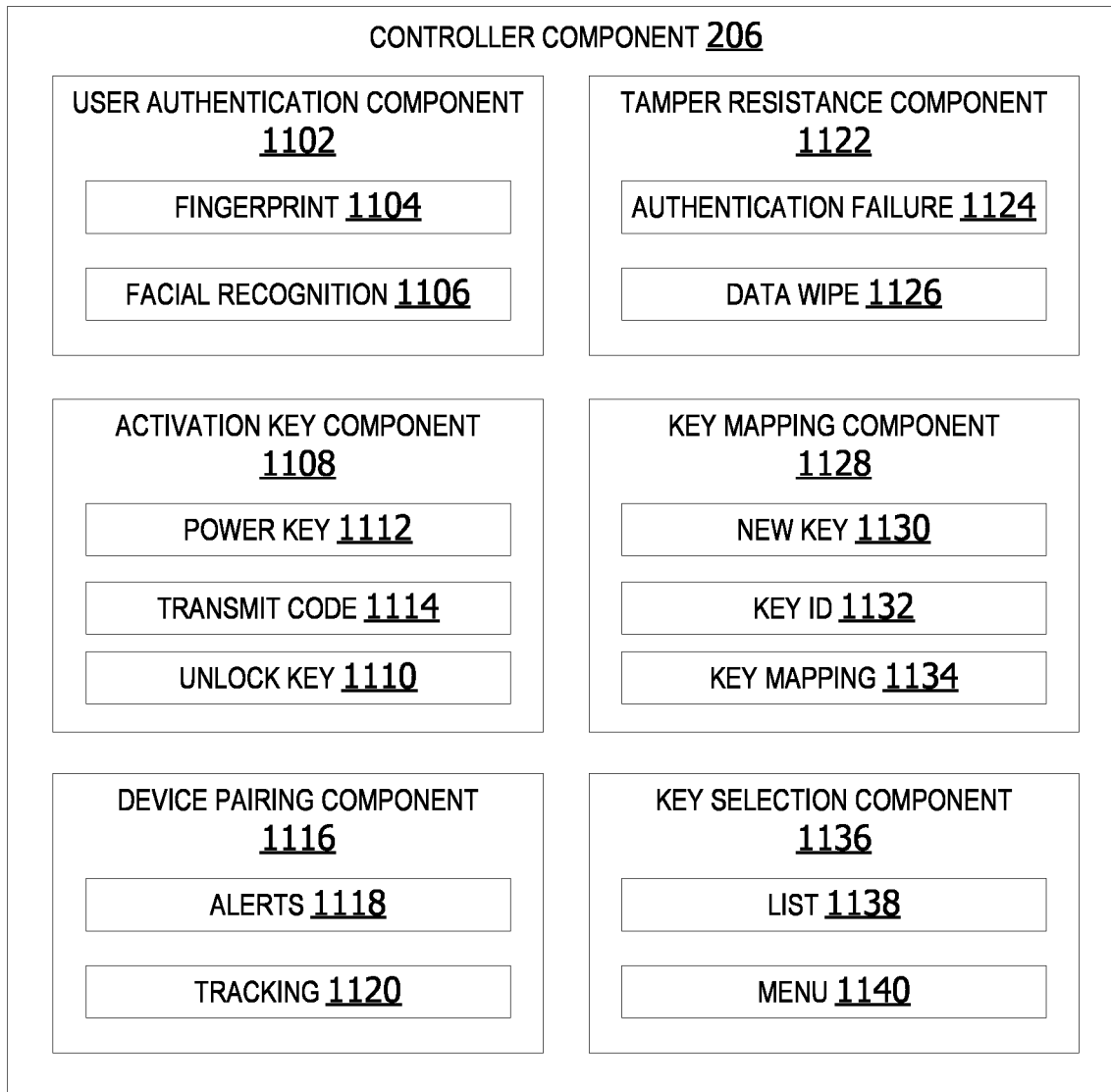
FIG. 11 is an exemplary block diagram illustrating a controller component.

FIG. 11 is an exemplary block diagram illustrating a controller component 206. In some examples, the controller component 206 includes a user authentication component 1102 for authenticating a user attempting to open the MDH or utilize an authentication device within the MDH. The authentication, in some examples, is performed using fingerprint 1104 scanning, facial recognition 1106 or other biometrics data received from the user authentication device, such as the user authentication device 114 in FIG. 1.

A key activation component 1108, in some examples, can unlock key 1110. The unlock key 1110 operation unlocks an authentication device in response to selection of the authentication device. The device may be unlocked based on biometric data or other user authentication data. The key activation component can power key 1112 and/or enable the key to transmit code 1114. Powering the key refers to providing power to the selected authentication device. Enabling the key to transmit code refers to transmitting the authentication code generated by the selected authentication device to the user device connected to the MDH via the external port connector. The code can include an encryption key, a password, a pin or other code.

An authentication device within the MDH can likewise require user authentication via fingerprint scan or other biometric data prior to unlocking or activating the authentication device. In such cases, if the user successfully performs user authentication by providing biometric data via the fingerprint 1104 scanning, facial recognition 1106 or other biometric scanning on the MDH, the MDH sends a code to the authentication device within the MDH indicating successful user authentication to unlock the authentication device. The unlocked authentication device can then generate the authentication code which is sent to the user (computing) device via the connection port on the MDH plugged into the corresponding port on the user device.

In other examples, a device pairing component 1116 enables a user to pair the MDH with a selected user device, such as, but not limited to, a smart phone (cellular telephone) or tablet. The pairing enables the user device to receive alerts 1118 from the MDH associated with utilization of the authentication devices, attempted unauthorized use of the MDH, failed user authorization, attempt to break into the MDH, etc.

The device pairing also permits the user to track the location of the MDH using the user device. The user device in some examples utilizes a geofence around the user device. If the MDH leaves the geofence area surrounding the user device, the user device alerts the user. Likewise, if the user cannot find the MDH, the user device can identify the location of the MDH if it is within a predetermined range of the user device. Moreover, if the tracking indicates the MDH has been taken by an unauthorized user, the owner can remotely trigger wiping of the MDH and/or devices on the MDH via a user device paired with the MDH.

A tamper resistance component 1122, in some examples, enables the controller component to perform a data wipe 1126 on one or more of the authentication keys and/or the MDH in response to an authentication failure or attempted unauthorized access of the MDH. In some examples, the data wipe is not performed unless a failed authentication occurs a threshold number of times within a predetermined time period, such as, but not limited to, three or more failed attempts within a given time period.

In some examples, the tamper resistance component 1122 wipes or destroys individual keys if tampering of the MDH is detected (i.e. attempt to open housing without proper biometric credentials). A set of high voltage capacitors within the device, powered by the battery, is connected to the processor—which authenticates the obtained biometric data for authentication. The processor may send a command to the capacitors to wipe or otherwise destroy the devices after the threshold number of attempts is reached. This user configurable threshold prevents accidental deletion of data or damage to authentication devices within the MDH.

The key mapping component 1128 in other examples determines when a new key 1130 is placed into the MDH, the key mapping 1134 component maps a user provided key ID 1132 to one or more accounts. In still other examples, a key selection component 1136 provides a menu 1140 of options for predefined functions, such as, selection of an authentication device from a list 1138 of authentication devices.

FIG. 12 is an exemplary block diagram illustrating a user interface 208 displaying a list 1138 of authentication devices stored in the MDH for selection by a user. The list 1138 in this non-limiting example includes an authentication device ID 1202, a mapped account ID 1204 and/or a role ID 1206.

Figure 13:
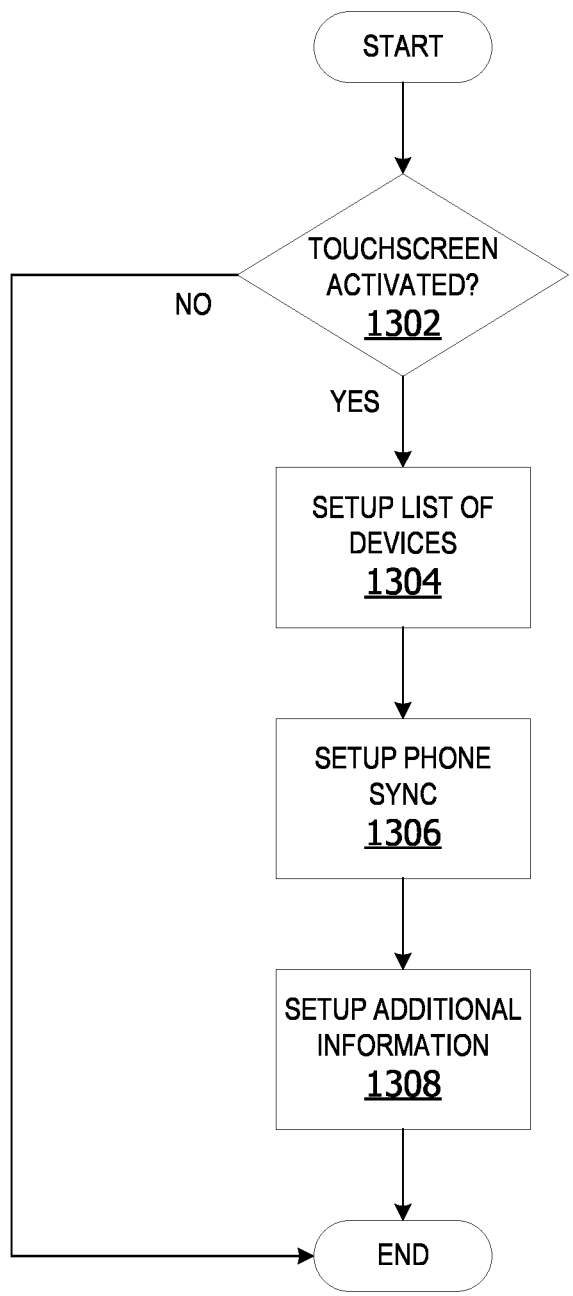
FIG. 13 is an exemplary flow chart illustrating operation of the MDH to setup device pairing.

FIG. 13 is an exemplary flow chart illustrating operation of the MDH to setup device pairing. The process shown in FIG. 13 is performed by a controller component, executing on a multi-factor device holder, such as the MDH 100 in FIG. 1.

The process begins by determining whether a touchscreen is activated by a user at 1302. The touchscreen is a UI, such as, but not limited to, the user interface device 208 in FIG. 2. If yes, the controller component outputs a set of menu options enabling the user to setup a list of authentication devices on the MDH at 1304. The setup can include creating an ID for each authentication device, mapping each authentication device to an account, etc.

A setup for syncing a smart phone or other user device with the MDH is provided at 1306. The user device is a computing device, such as, but not limited to, the user device 300 in FIG. 3. The setup pairs the MDH with a user device such that the user device can receive alerts associated with attempted or unauthorized access, as well as tracking of the location of the MDH. The MDH can prompt the user to setup additional information at 1308. The additional information can include alert preferences, geofencing, setting up security settings, calibrating biometric sensors, etc. The process terminates thereafter.

Figure 14:
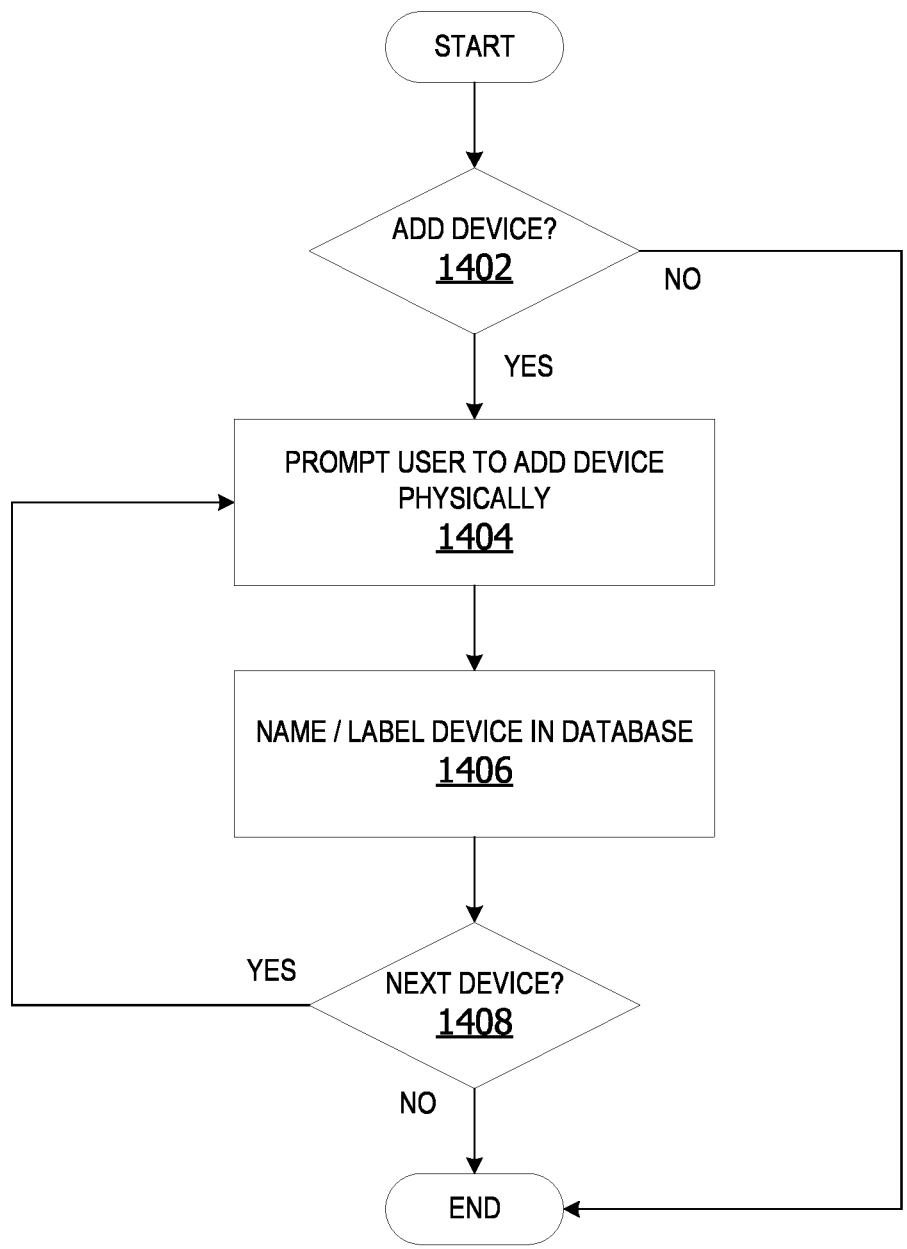
FIG. 14 is an exemplary flow chart illustrating operation of the MDH to add new authentication devices to the MDH.

FIG. 14 is an exemplary flow chart illustrating operation of the MDH to add new authentication devices to the MDH. The process shown in FIG. 14 is performed by a controller component, executing on a multi-factor device holder, such as the MDH 100 in FIG. 1.

The process begins by determining whether the user is adding a new authentication device to the MDH at 1402. If yes, the controller component prompts the user to physically add the new device to the MDH at 1404. The user can add the device by plugging the device into one of the ports inside the housing of the MDH, such as, but not limited to, the set of ports 106 in FIG. 1. The MDH names or labels the new device in a database 1406. The database is a memory or data store within the MDH, such as, but not limited to, the data storage device 226 in FIG. 2. In some examples, the user provides the name or ID label for the device. In other examples, the controller component provides a name or label. The name or label can be randomly generated or assigned based on a user-defined naming convention.

A determination is made whether a next authentication device is being added to the MDH at 1408. If yes, the process iteratively executes operations 1402 through 1408 until no new devices are being added. The process terminates thereafter.

Figure 15:
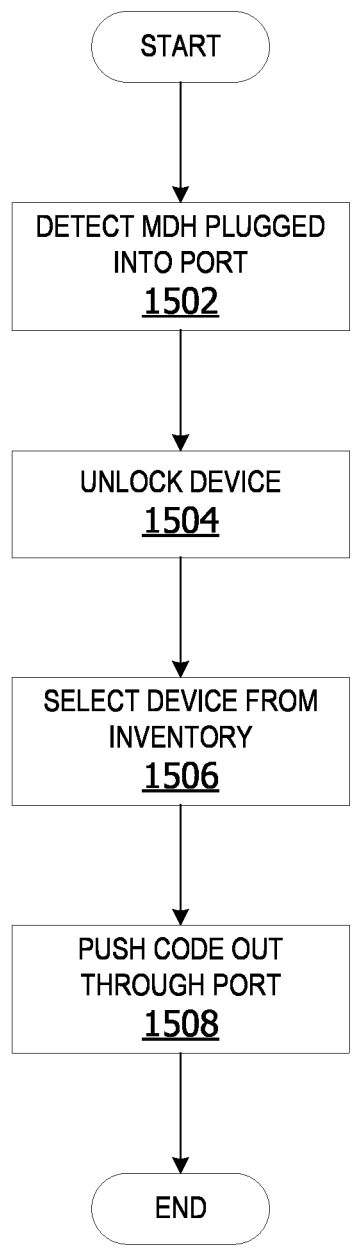
FIG. 15 is an exemplary flow chart illustrating operation of the MDH to activate a selected authentication device.

FIG. 15 is an exemplary flow chart illustrating operation of the MDH to activate a selected authentication device. The process shown in FIG. 15 is performed by a controller component, executing on a multi-factor device holder, such as the MDH 100 in FIG. 1.

The process begins by detecting the MDH external port connector plugged into a port on a user device at 1502. The external port connector is a connection corresponding to a port on a user device, such as, but not limited to, the external port connector 102 in FIG. 1. The device is unlocked at 1504. In some examples, fingerprint scanning or other biometric input is utilized to unlock the device. An authentication device selection is received from the user at 1506. The selection can be received via a user interface or other key selection mechanism on the MDH, such as, but not limited to, the key selection device 118 in FIG. 1 and/or the user interface device 208 in FIG. 2. The selected device is activated. A code generated by the selected device is pushed out through the port at 1508. The process terminates thereafter.

Figure 16:
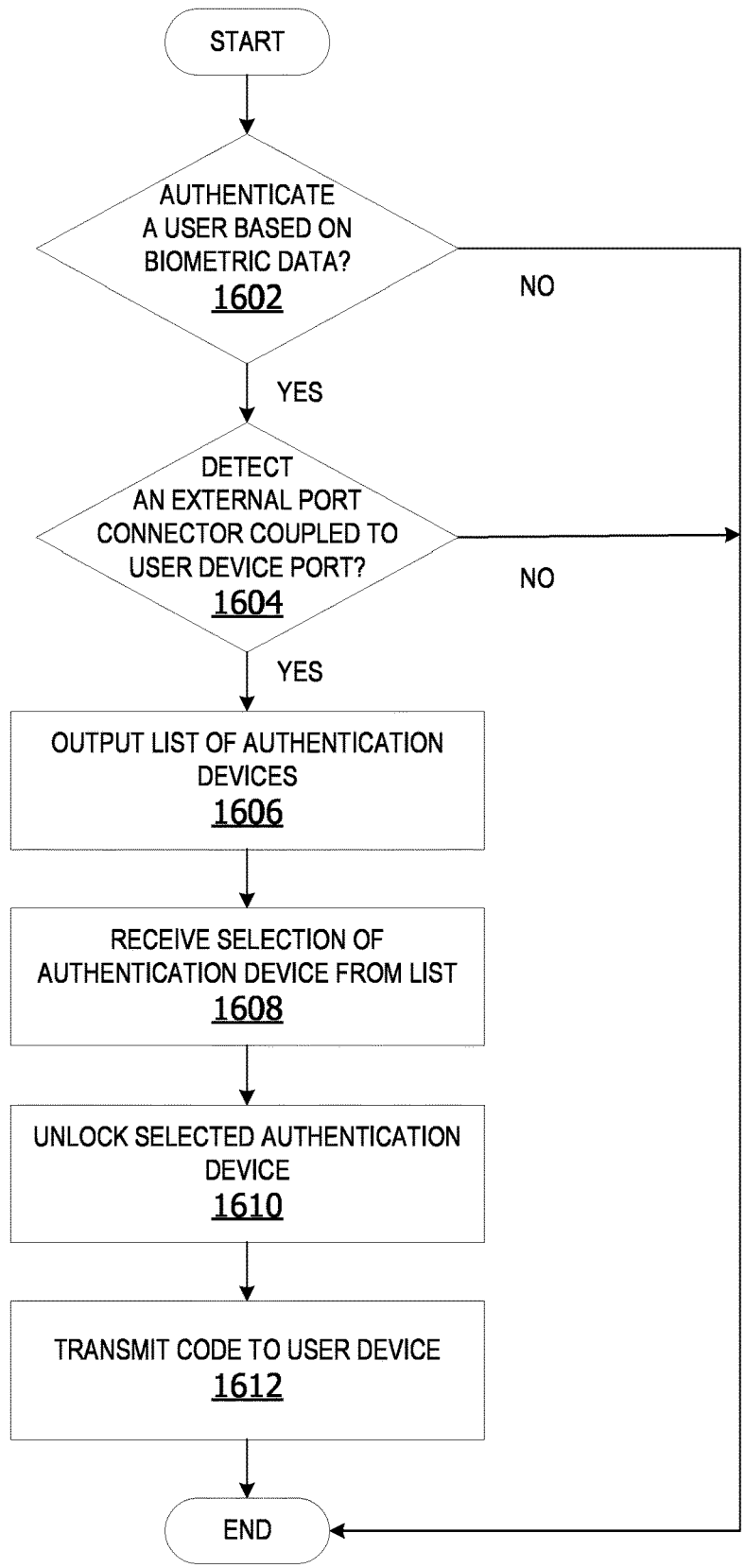
FIG. 16 is an exemplary flow chart illustrating operation of the MDH to activate a selected authentication device.

FIG. 16 is an exemplary flow chart illustrating operation of the MDH to activate a selected authentication device. The process shown in FIG. 16 is performed by a controller component, executing on a multi-factor device holder, such as the MDH 100 in FIG. 1.

The process begins by determining if a user is authenticated based on biometric data at 1602. The biometric data is gathered from the user via a biometric reader, such as, but not limited to, the user authentication device 114 in FIG. 1 and/or the biometric reader 210 in FIG. 2. If yes, a determination is made whether an external port connector coupled to a user device is detected at 1604. If yes, a list of authentication devices on the MDH is output at 1606. The list is an inventory of authentication devices currently stored within the MDH, such as, but not limited to, the list 1138 in FIG. 11. A user selection of an authentication device from the list is received at 1608. The selected authentication device is unlocked at 1610. Unlocking the device includes unlocking the device by sending an authentication signal and/or providing power to the device. A code generated by the selected authentication device is transmitted to the user device at 1612. The process terminates thereafter.

ADDITIONAL EXAMPLES

In some examples, multiple different form factor devices plug into a multi-factor device holder. The MDH integrates the authentication devices and houses the multiple devices in a single unit, with one unified control or UI to access/control any/all different devices.

In other examples, the MDH includes a biometric reader for device security, in addition to the actual biometric security of an individual device that is integrated/plugged into the holder). This provides security for keeping devices integrated and protected from unauthorized removal of the device from the holder. The biometric (fingerprint) authentication is utilized to unlock the MDH device.

In still other examples, the MDH enables pairing of the MDH to a cell phone or other user device for tracking/alerting purposes and remote wipe/device termination. Tamper resistant locking mechanism can destroy the housed multi-factor devices and wipe the local storage of the MDH if someone tries to break into the MDH. The MDH can further eliminate the need for a user to remember what device goes to which account and manually plugging/unplugging each multi-factor device by allowing the user to pick from a list of their own making to align with said account.

The MDH UI provides for user selection of which integrated/plugged in key to activate. The selected key is then powered/connected to the port connection between device holder to computer.

The port connection in some examples is a USB-A, USB-C, or lightning connection enabling the MDH to a computer (or any available port style, or via adapter to any type of port connection). In other examples, the MDH connects to the user device via a near-field connection (NFC) between the MDH and the user device (workstation). The user interface in other examples includes a touchscreen. The user interface can include a virtual keyboard and/or built-in commands, such as a menu.

In an exemplary scenario, a user may have five different authentication devices to access different accounts and one or more different roles on one or more of those accounts. For example, the user may have an authentication device for accessing an email account and another different authentication device for accessing an administrator account. Instead of plugging a first authentication device into a user device to access the email account and then physically switching it out for a second authentication device when the user is ready to switch from the email account to the administrator account, the user plugs the MDH device into the user device. The user selects the key for the email account and then selects the key for the administrator account to change account/role access, without removing the MINI device from the port. The user selects which authentication device they want to use without having to search for a physical authentication key. Switching from one account to another does not require physical removal of one physical authentication key device and replacement of that key with a different authentication key device.

Alternatively, or in addition to the other examples described herein, examples include any combination of the following:
  a user interface device configured to output a list of authentication devices stored within the MDH and receive a user selection of an authentication device from the list;
  a set of controls on the exterior surface of the housing, wherein each control in the set of controls corresponds to a port for connecting to a connector on an authentication device stored within the housing;
  wherein the user authentication device further comprises a fingerprint reader;
  a removable member, wherein the removable member is secured in a closed configured by the locking mechanism when the locking mechanism is engaged;
  wherein the locking mechanism releases the removable member enabling the housing to be opened responsive to authentication of the user;
  a set of guides configured to secure the set of authentication devices within the housing;
  a data storage device within the MDH, the data storage device configured to store a list of authentication devices stored within the MDH and user authentication data for authenticating a user based on biometric data generated by at least one biometric reader;
  responsive to receiving a selection of a second authentication device from the list, de-activating the first selected authentication device;
  unlocking the second selected authentication device;
  transmitting a code generated by the second selected authentication device to the user device via the external port connector;
  pairing the MDH to a selected user device for tracking a location of the MDH device, wherein the user device tracks the location of the MDH;
  pairing the MDH to a selected user device for alerting purposes, wherein the user device receives alerts associated with attempts to utilize the MDH;
  securing, by a locking mechanism, a removable member of the housing in a closed configured;
  receiving, via a set of controls on the exterior surface of the housing, the selection of the authentication device from the list, wherein each control in the set of controls corresponds to a port for connecting to a connector on an authentication device stored within the housing;
  deleting, by a tamper resistance component, data associated with the MDH in response to an authentication failure or attempted unauthorized access of the MDH;
  a locking mechanism configured to secure the housing in a closed configured when locked;
  a user authentication device configured to authenticate a user attempting to utilize the selected authentication device or unlock the locking mechanism to access the set of authentication devices stored within the housing;
  wherein the user authentication device further comprises a fingerprint reader;
  a set of guides configured to secure the set of authentication devices within the housing; and
  a data storage device within the MDH, the data storage device configured to store a list of authentication devices stored within the MDH and user authentication data for authenticating a user based on biometric data generated by at least one biometric reader.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, and FIG. 12 can be performed by other elements in 1, FIG. 2, FIG. 3, FIG. 4, FIG. 5, FIG. 6, FIG. 7, FIG. 8, FIG. 9, FIG. 10, FIG. 11, and FIG. 12, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, and FIG. 12.

In some examples, the operations illustrated in FIG. 13, FIG. 14, FIG. 15, and FIG. 16 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing devices in a MDH, the method comprising authenticating, via a user authentication device, a user based on biometric data generated by at least one biometric reader; detecting an external port connector communicatively coupled to a port on a user device; outputting, via a user interface device, a list of authentication devices stored within the MDH on condition the user is authenticated by the user authentication device; receiving, by a key selection device, a selection of an authentication device from the list of authentication devices; unlocking, by a controller component, the selected authentication device, wherein the unlocked first selected authentication device receives power from at least one power supply; and transmitting a code generated by the selected authentication device to the user device via the external port connector.

While the aspects of the disclosure have been described in terms of various examples with their associated operations, a person skilled in the art would appreciate that a combination of operations from any number of different examples is also within scope of the aspects of the disclosure.

The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users, such as biometric data. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones (cellular phones), mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for storing authentication devices in a multi-factor device holder. For example, the elements illustrated in FIG. 1, FIG. 2, FIG. 3, FIG. 4, FIG. 5, FIG. 6, FIG. 7, FIG. 8, FIG. 9, FIG. 10, FIG. 11, and FIG. 12, such as when encoded to perform the operations illustrated in FIG. 13, FIG. 14, FIG. 15 and FIG. 16, constitute exemplary means for authenticating, via a user authentication device, a user based on biometric data generated by at least one biometric reader; exemplary means for detecting an external port connector communicatively coupled to a port on a user device; exemplary means for outputting, via a user interface device, a list of authentication devices stored within the MDH on condition the user is authenticated by the user authentication device; exemplary means for receiving, by a key selection device, a selection of an authentication device from the list of authentication devices; exemplary means for unlocking, by a controller component, the selected authentication device, wherein the unlocked first selected authentication device receives power from at least one power supply; and exemplary means for transmitting a code generated by the selected authentication device to the user device via the external port connector.

Other non-limiting examples provide one or more computer storage devices having a first computer-executable instructions stored thereon for managing a multi-factor device holder. When executed by a computer, the computer performs operations including authenticating, via a user authentication device, a user based on biometric data generated by at least one biometric reader; detecting an external port connector communicatively coupled to a port on a user device; outputting, via a user interface device, a list of authentication devices stored within the MDH on condition the user is authenticated by the user authentication device; receiving, by a key selection device, a selection of an authentication device from the list of authentication devices; unlocking, by a controller component, the selected authentication device, wherein the unlocked first selected authentication device receives power from at least one power supply; and transmitting a code generated by the selected authentication device to the user device via the external port connector.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A multi-factor device holder comprising:
    an external port connector configured to communicatively couple to a port on a user device;
    a key selection device comprising at least one selection mechanism receives a selection of an authentication device from a set of authentication devices;
    a set of ports enclosed within a housing, the set of ports communicatively coupled to a set of connectors on the set of authentication devices;
    a locking mechanism secures the housing in a closed configuration when locked;
    a user authentication device authenticates a user attempting to utilize the selected authentication device and unlocks the locking mechanism to access the set of authentication devices stored within the housing; and
    a controller component, implemented on at least one processor, unlocks the selected authentication device; and
    the controller component enables the selected authentication device to receive power from a power source configured to provide power to at least one authentication device associated with the MDH on condition the user is authenticated by the user authentication device, wherein the selected authentication device transmits a code to the user device via the external port connector.

2. The multi-factor device holder of claim 1, wherein the key selection device further comprises:
    a user interface (UI) device outputs a list of authentication devices stored within the MDH; and
    the UI device receives a user selection of an authentication device from the list.

3. The multi-factor device holder of claim 1, wherein the key selection device further comprises:
    a set of controls on an exterior surface of the housing, wherein each control in the set of controls corresponds to a port for connecting to a connector on an authentication device stored within the housing.

4. The multi-factor device holder of claim 1, wherein the user authentication device further comprises a fingerprint reader.

5. The multi-factor device holder of claim 1, further comprising:
    a removable member, wherein the removable member is secured in a closed configured by the locking mechanism when the locking mechanism is engaged, wherein the locking mechanism releases the removable member enabling the housing to be opened responsive to authentication of the user.

6. The multi-factor device holder of claim 1, further comprising:
    a set of guides configured to secure the set of authentication devices within the housing.

7. The multi-factor device holder of claim 1, further comprising:
    a data storage device within the MDH that stores a list of authentication devices stored within the MDH and user authentication data for authenticating a user based on biometric data generated by at least one biometric reader.

8. A method for storing a set of authentication devices within a multi-factor device holder (MDH), the method comprising:
    authenticating, via a user authentication device, a user based on biometric data generated by at least one biometric reader;
    detecting an external port connector communicatively coupled to a port on a user device;
    outputting, via a user interface device, a list of authentication devices stored within the MDH on condition the user is authenticated by the user authentication device;
    receiving, by a key selection device, a selection of an authentication device from the list of authentication devices;
    unlocking, by a controller component, the selected authentication device, wherein the selected authentication device receives power from at least one power supply while unlocked;
    transmitting a code generated by the selected authentication device to the user device via the external port connector; and wherein the selected authentication device is a first selected authentication device and further comprising:
responsive to receiving a selection of a second authentication device from the list, de-activating the first selected authentication device;
unlocking the second selected authentication device; and
transmitting a code generated by the second selected authentication device to the user device via the external port connector.

9. The method of claim 8, further comprising:
pairing the MDH to a selected user device for tracking a location of the MDH device, wherein the user device tracks the location of the MDH.

10. The method of claim 8, further comprising:
pairing the MDH to a selected user device for alerting purposes, wherein the user device receives alerts associated with attempts to utilize the MDH.

11. The method of claim 8, further comprising:
securing, by a locking mechanism, a removable member of a housing in a closed configured.

12. The method of claim 8, further comprising:
receiving, via a set of controls on an exterior surface of a housing, the selection of the authentication device from the list, wherein each control in the set of controls corresponds to a port for connecting to a connector on an authentication device stored within the housing.

13. The method of claim 8, further comprising:
deleting, by a tamper resistance component, data associated with the MDH in response to an authentication failure or attempted unauthorized access of the MDH.

14. A multi-factor device holder (MDH) for storing a plurality of authentication devices, the MDH comprising:
a processor;
at least one processor communicatively coupled to a memory;
a set of ports enclosed within a housing configured to communicatively couple to a set of connectors on a set of authentication devices;
an external port connector configured to communicatively couple to a port on a user device, wherein a code generated by a selected authentication device is pushed to the user device via the external port connector;
a user interface device outputs a list of identifiers associated with a set of authentication devices stored within the housing of the MDH;
a controller component, implemented on the at least one processor, activates the selected authentication device responsive to receiving a selection of an authentication device from the list via the user interface device;
a locking mechanism secures the housing in a closed configured when locked; and
a user authentication device authenticates a user attempting to utilize the selected authentication device and unlocks a locking mechanism to access the set of authentication devices stored within the housing.

15. The multi-factor device holder of claim 14, wherein the user authentication device further comprises a fingerprint reader.

16. The multi-factor device holder of claim 14, further comprising:
a set of guides secures the set of authentication devices within the housing.

17. The multi-factor device holder of claim 14, further comprising:
a data storage device within the MDH stores a list of authentication devices stored within the MDH and user authentication data for authenticating a user based on biometric data generated by at least one biometric reader.

* * * * *